(12) United States Patent
Karon et al.

(10) Patent No.: US 10,827,013 B2
(45) Date of Patent: Nov. 3, 2020

(54) DYNAMICALLY MODIFYING SYSTEMS TO INCREASE SYSTEM EFFICIENCY

(71) Applicant: New Relic, Inc., San Francisco, CA (US)

(72) Inventors: Jonathan Karon, Portland, OR (US); David Nichol, Portland, OR (US)

(73) Assignee: NEW RELIC, INC., San Francisco, CA (US)

( * ) Notice: Subject to any disclaimer, the term of this patent is extended or adjusted under 35 U.S.C. 154(b) by 59 days.

(21) Appl. No.: 15/853,479

(22) Filed: Dec. 22, 2017

(65) Prior Publication Data

US 2019/0199810 A1  Jun. 27, 2019

(51) Int. Cl.
*G06F 16/2457* (2019.01)
*G06F 17/10* (2006.01)
*H04L 29/08* (2006.01)

(52) U.S. Cl.
CPC .......... *H04L 67/22* (2013.01); *G06F 16/2457* (2019.01); *G06F 16/24578* (2019.01); *G06F 17/10* (2013.01); *H04L 67/025* (2013.01)

(58) Field of Classification Search
None
See application file for complete search history.

(56) References Cited

U.S. PATENT DOCUMENTS

| | | | |
|---|---|---|---|
| 2004/0255032 A1* | 12/2004 | Danieli | H04L 67/38 709/229 |
| 2008/0071630 A1 | 3/2008 | Donahue | |
| 2008/0140506 A1* | 6/2008 | Christianson | G06Q 30/02 705/14.44 |
| 2010/0106586 A1 | 4/2010 | Etheredge et al. | |
| 2014/0195298 A1 | 7/2014 | Sri et al. | |
| 2015/0371239 A1 | 12/2015 | Hoyne | |

(Continued)

FOREIGN PATENT DOCUMENTS

WO  WO 2013/116105 A1  8/2013

OTHER PUBLICATIONS

International Search Report and Written Opinion, PCT Application No. PCT/IB2018/059017, dated Mar. 4, 2019, 9 pages.

*Primary Examiner* — Sargon N Nano
*Assistant Examiner* — Christopher B Robinson
(74) *Attorney, Agent, or Firm* — Fenwick & West LLP (57) ABSTRACT

Users of client devices can take any number of actions using applications of an application system to achieve an outcome. A monitoring system aggregates the interactions into a user interaction path. Over time, the monitoring system generates a large number of user interaction paths. The monitoring system analyzes the user interaction paths for correlation between interactions and outcomes. The monitoring system can correlate user interaction paths to generated interactions of a system interaction path. The monitoring system determines a correlation between interactions and outcomes by calculating a success factor based on an efficiency score and a prevalence score. The success factor is a measure correlation between a particular interaction of the application system and an outcome, the prevalence score is a measure of how often a particular interaction occurs, and the efficiency score is a measure of the application system performance for a particular interaction.

21 Claims, 6 Drawing Sheets

(56) References Cited

U.S. PATENT DOCUMENTS

| | | | |
|---|---|---|---|
| 2015/0379556 A1* | 12/2015 | Udassin | G06Q 30/0243 |
| | | | 705/14.42 |
| 2016/0308816 A1* | 10/2016 | Harpur | G06Q 10/10 |
| 2016/0328739 A1* | 11/2016 | Synett | G06Q 30/0202 |
| 2017/0308799 A1* | 10/2017 | Eidelman | G06F 40/205 |
| 2018/0121499 A1* | 5/2018 | Joshi | G06Q 10/101 |
| 2018/0150870 A1* | 5/2018 | Haaland | G06Q 10/06393 |

* cited by examiner

DYNAMICALLY MODIFYING SYSTEMS TO INCREASE SYSTEM EFFICIENCY

BACKGROUND

Field

This disclosure relates generally to monitoring interactions between users and an application system and, more specifically, to dynamically modifying the application system to increase the frequency of a desired outcome from user-system interactions.

Description of the Related Art

In traditional client-server interactions between customers and vendors of goods and services, customers use client devices such as computers and smartphones to access and/or purchase those goods or services. For example, a customer may use a web browser on their smartphone to access a website and watch a video, buy clothing, or join a dating site. While many of these interactions between potential customers and goods and services vendors result in an outcome considered positive by the vendor, others do not. Drawing conclusions about why particular interactions resulted or failed to result in the desired outcome is a difficult challenge.

SUMMARY

Users of client devices can take any number of actions using applications of an application system to achieve an outcome. Outcomes for the application system can include purchasing a product, watching a video, joining a dating network, etc. As users interact with the application system, a monitoring system monitors the interactions during a monitoring session. Broadly, a monitoring session is any period of time that the monitoring system monitors interactions between a user and the application system. In some configurations, the monitoring system continually monitors interactions between a user and an application system. However, here, monitoring sessions are initiated in response to a specific interaction related to the outcome for ease of description and understanding.

The monitoring system aggregates the interactions into a user interaction path. Over time, users interact with the application system and the monitoring system generates a large number of user interaction paths. Further, the monitoring system analyzes the user interaction paths and determines correlations between interactions and outcomes of the application system.

In some cases, the monitoring system analyzes system interaction paths for correlation to an outcome. A system interaction path is a set of interactions that the application system may generate in response to a specific interaction. Generally, the system interaction path is configured to guide a user towards the outcome via a set of interactions. In these cases, users may execute some of the interactions of the system interaction path and user interaction paths include the executed interactions of the system interaction path. Accordingly, the monitoring system can determine which interactions of the system interaction path are correlated to a particular outcome.

The monitoring system determines a correlation between interactions and outcomes by calculating a success factor for each interaction. The success factor is a measure of correlation between a particular interaction and an outcome of the application system. To calculate the success factor, the monitoring system partitions the user interaction paths into a group of user interaction paths achieving a goal and a group of user interaction paths not achieving the goal. The monitoring system calculates a prevalence score and an efficiency score for each of the groups. The prevalence score is a measure of how often a particular interaction occurs in each group and the efficiency score is a measure of the application system performance for the particular interaction. The monitoring system assigns a weight to the efficiency score and a weight to the prevalence score and calculates the success factor using a weighting function and the weighted scores.

The monitoring system modifies the application system to increase the likelihood of users achieving an outcome based on the calculated success factors. In various embodiments, the monitoring system can increase hardware resources, modify system interaction paths, or generate additional interactions to increase the likelihood of users achieving an outcome.

In one configuration, a user of a client device can initiate the analysis of user interaction paths. In response, the application system calculates the success factors for various interactions and returns the success factors to the user as a visualization. The visualization allows the user to easily visualize the correlations between interactions and outcomes.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to various embodiments by way of illustration only. It should be noted that from the following discussion, alternative embodiments of the structures and methods disclosed herein will be readily recognized as viable alternatives that may be employed without departing from the principles of what is claimed.

Consider an example computing environment in which a monitoring system monitors the interactions between a vendor and a user as a user interacts with an application system. In this example, a vendor offers products for sale and invites users to purchase a product at a discounted rate. Some users of the application system may purchase a product from the vendor, while others do not. For purposes of this example, then, a positive outcome is one in which a user purchases the product. Similarly, a negative outcome is one in which a user visits the vendor's site, but does not purchase the product. In various embodiments, a monitoring system monitors a path of the interactions between a user and the vendor taken during a session on the vendor's site and aggregates the paths of multiple users for analysis by the monitoring system. For example, the interactions in a user interaction path can include which pages are visited by the user, which links are followed to transition from one page to another, notifications transmitted from the vendor to the user, and whether the user purchases a product during the session. The monitoring system simultaneously monitors the performance of the application system during the interactions. For example, the monitoring system can measure how long it takes for a page to load once a hyperlink is clicked.

Over time, the monitoring system obtains a multitude of user interaction paths and system performance information as users browse and purchase goods on a vendor website. The user interaction paths and performance information can be analyzed to determine if certain interactions during a session are correlated to a particular outcome (e.g., completing or not completing a sale). Further, in various embodiments, the monitoring system can act to increase the likelihood of an outcome by, for example, optimizing the vendor web site, providing additional hardware resources to the website servers, changing interactions, prompts, or notifications, etc.

Figure 1:
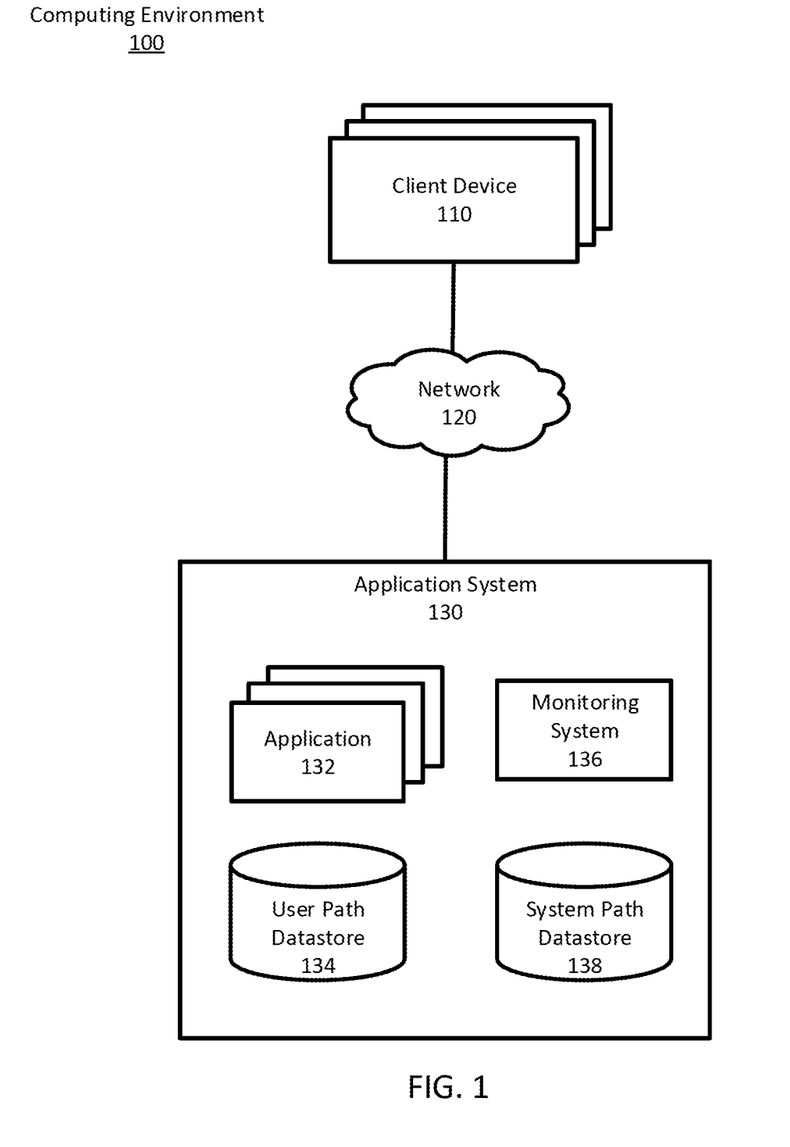
FIG. 1 is a diagram of a system environment for monitoring interactions between a user and an application system, according to one example embodiment.

FIG. 1 is a computing environment 100 including a monitoring system for correlating interactions to an outcome, according to one example embodiment. The computing environment 100 includes any number of client devices 110, a network 120, and an application system 130.

Each client device 110 includes one or more computing devices capable of processing data as well as transmitting and receiving data via a network 120. For example, a client device 110 may be a desktop computer, a laptop computer, a mobile phone, a tablet computing device, an Internet of Things (IoT) device, or any other device having computing and data communication capabilities. Each client device 110 includes a processor for manipulating and processing data, and a storage medium for storing data and program instructions associated with various applications executing on the client device 110. The storage medium may include both volatile memory (e.g., random access memory) and non-volatile storage memory such as hard disks, flash memory, and external memory storage devices. In addition to storing program instructions, the storage medium stores files as well as various data associated with the operation of applications on the client device 110. The client device 110 may include various applications and modules for performing a particular set of interactions, tasks, or activities for the user when interacting with the application system 130. In particular, using the above example, the client device 110 may allow a user to purchase a product on a website of the application system 130 via the network 120.

Within the environment 100, the network 120 represents the communication pathways between the client devices 110 and the application system 130. In one embodiment, the network 120 includes a wide area network (e.g., the Internet). The network 120 can also include one or more enterprise local area networks that utilize dedicated or private communications links that are not necessarily part of the Internet.

Application system 130 is a computer system configured to store, receive, and transmit data to client devices 110 or to other systems via the network 120. Application system 130 may include a singular computing system, such as a single computer, or a network of computing systems, such as a data center or a distributed computing system. The application system 130 includes a processor for manipulating and processing data and a storage medium for storing data and program instructions associated with various modules. In particular, the storage medium includes any number of applications 132, a user path datastore 134, a monitoring system 136, and a system path datastore 138. Alternative embodiments may include different or additional components or omit one or more of the illustrated components.

The application system 130 can interact with users operating client devices 110 to achieve an outcome of the application system 130 (e.g., purchase a product). Here, interactions include any action or operations allowed by the applications 132 including clicking links, reviewing pages, receiving visualizations, playing audio, sending product orders to a vendor, etc.

The application system 130 includes a monitoring system 136 that monitors interactions between users and the application system 130 during a monitoring session. Generally, a monitoring session includes all interactions between a user and the application system 130 during an interval of time. In various configurations, monitoring sessions include interactions from a specific time period (e.g., a calendar week), interactions within a threshold period of time from a triggering time or interaction (e.g., three hours after a purchase), all interactions from a specific user, a period of time where a user interacts with a web-site prior to a timeout threshold, etc. In some cases, the monitoring system monitors all interactions between a user and the application system (e.g., the interval of time is infinite). The monitoring system 136 aggregates the monitored interactions in a given monitoring session into a user interaction path representing the series of interactions monitored during the monitoring session. Each user interaction path can be associated with a unique identifier or metadata that allows each user interaction path to be independently identified, stored, and accessed in the user path datastore 134. In some embodiments, client devices 110 can additionally (or alternatively) include a monitoring system 136.

Monitoring system 136 analyzes user interaction paths to determine correlations between interactions included in the user interaction paths and an outcome (e.g., purchasing the product). In one embodiment, the application system 130 analyzes a system interaction path using the interactions included in user interaction paths. Broadly, a system interaction path includes a set of interactions that application(s) 132 can generate to facilitate a user achieving an outcome. The monitoring system 136 can include system interaction paths that are associated with specific interactions or outcomes. As one example, a system interaction path can be associated with the interaction of a user clicking a link for a product. In response to the user clicking the link, the applications 132 generate a series of interactions (e.g., loading a web-pages, providing a review, etc.) included in a system interaction path. As users interact with the application system 130, some interactions generated as part of the system interaction paths are executed by the users and are included in user interaction paths while others are not. As such, the application system can use the interactions of the user interaction paths to analyze the effectiveness of a system interaction path.

The application system 130 can include any number or types of system interaction paths designed to achieve various outcomes. For example, the application system 130 can include a funnel path including a specific set of interactions to guide a user towards an outcome. In another example, the application system 130 can include a retention path including interactions configured to encourage repeated use of the application system 130 (e.g., repeated purchases of products). Funnel and retention paths are described in more detail in regards to FIGS. 3 and 4. The system interaction paths are stored in the system path datastore 138.

The monitoring system 136 compares interactions in the user interaction paths against the interactions included in a system interaction path to determine which interactions, if any, are correlated to achieving an outcome. Based on the analysis, the monitoring system 136 can modify the application system 130 to increase the likelihood of users achieving an outcome. In various embodiments, the monitoring system can increase the likelihood of users achieving an outcome by increasing hardware resources associated with an interaction, modifying system interaction paths, creating new interactions, modifying the user interface of applications or client devices to encourage (or discourage) interactions and outcomes, modifying an interaction to influence a user's behavior (e.g., modifying a price, offering a reward, sending a coupon, etc.), or any other method of increasing the likelihood of users achieving an outcome. In some cases, the monitoring system 136 can increase the likelihood of users achieving an outcome by interacting with an external network system. For example, the monitoring system 136 may send performance reports an external network system, the external network system may generate independent encouragement interactions for the monitoring system 136, or the external network system may modify system interaction paths of the monitoring system 136.

In some embodiments, the monitoring system 136 can filter user interaction paths. That is, the monitoring system 136 can remove user interaction paths from the set of user interaction paths analyzed for correlation between interactions and an outcome. Filtering user interaction paths allows the application system 130 to optimize outcomes based on specific subsets of users, interactions, interaction paths, or any other criteria that may lead to additional positive outcomes). Filtering the user interaction paths can additionally include, for example, removing user interaction paths received from a specific user or set of users, removing interactions from user interaction paths (e.g., removing interactions that are rarely or commonly triggered, calculating relative frequency between interactions and eliminating outliers, etc.), removing user interaction paths from a specific time interval, removing system interaction paths that trigger a specific system performance degradation or error, classifying positive outcomes as negative outcomes if specific interactions (or degree of interactions) are taken (e.g., not purchasing a specific item, purchasing costing below a threshold amount, etc.), etc.

In some embodiments, the monitoring system 136 can receive a request from an administrator (e.g., a user with administrative privileges for the application system 130) to initiate a correlation analysis (i.e., determine correlations between interactions and outcomes) according to a correlation policy. In response, the monitoring system 136 analyzes the user interaction paths and provides the resulting correlation analysis to the requesting user. The correlation policy is a set of parameters that define how user interaction paths are analyzed by the monitoring system 136. The set of parameters can include a set of outcomes to correlate with interactions, weighting values and weighting functions for the analysis, correlation visualization instructions, a selected interaction for correlation against outcomes, filter settings, or any other information that can be used when analyzing user interaction paths. In some embodiments, the monitoring system 136 can return the results of the correlation analysis to the user as a visualization for display on a client device 110.

Figure 2:
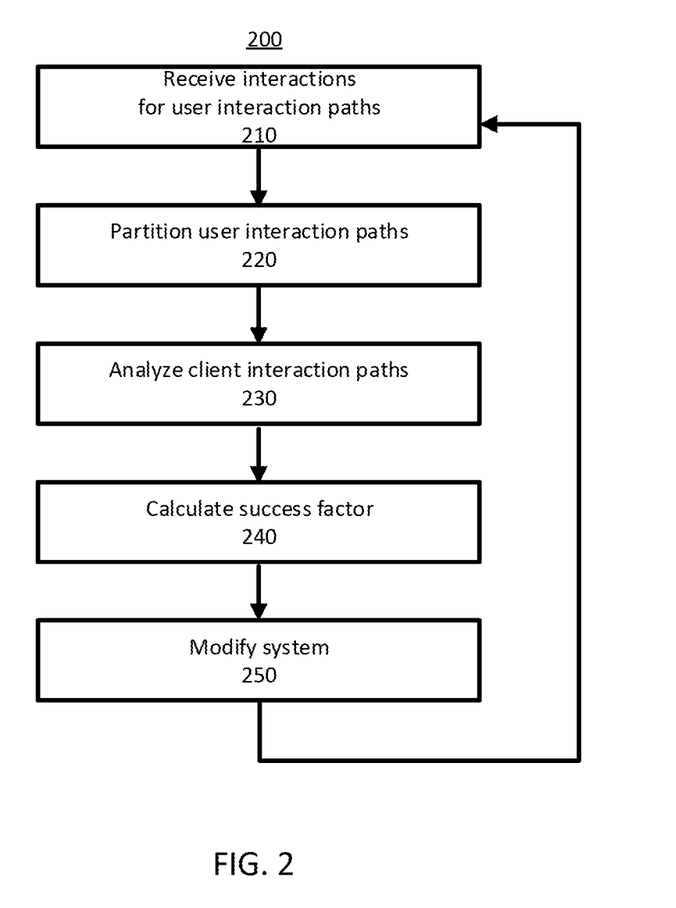
FIG. 2 is a flow diagram of a technique for determining a correlation between interactions and an outcome for an application system, according to one example embodiment.

FIG. 2 is a flowchart illustrating a technique 200 for determining a correlation between interactions and outcomes in the application system 130 and modifying the application system 130 to achieve an outcome. In various embodiments, the technique may include more or fewer steps or steps in an order other than those illustrated.

Continuing the aforementioned example, the monitoring system 136 initiates a monitoring session once the vendor website offers the product for sale to a user. During the monitoring session, the monitoring system 136 monitors the interactions between users and the application system 130. Here, selling the product to a user is associated with a funnel path by an administrative user to facilitate the user purchasing the product. The funnel path includes applications 132 generating interactions for purchasing the product including sending product information to users, playing an audio message about the product for the user, presenting a purchase page with the product to the user, and receiving a purchase order for the product from the user.

Figure 3:
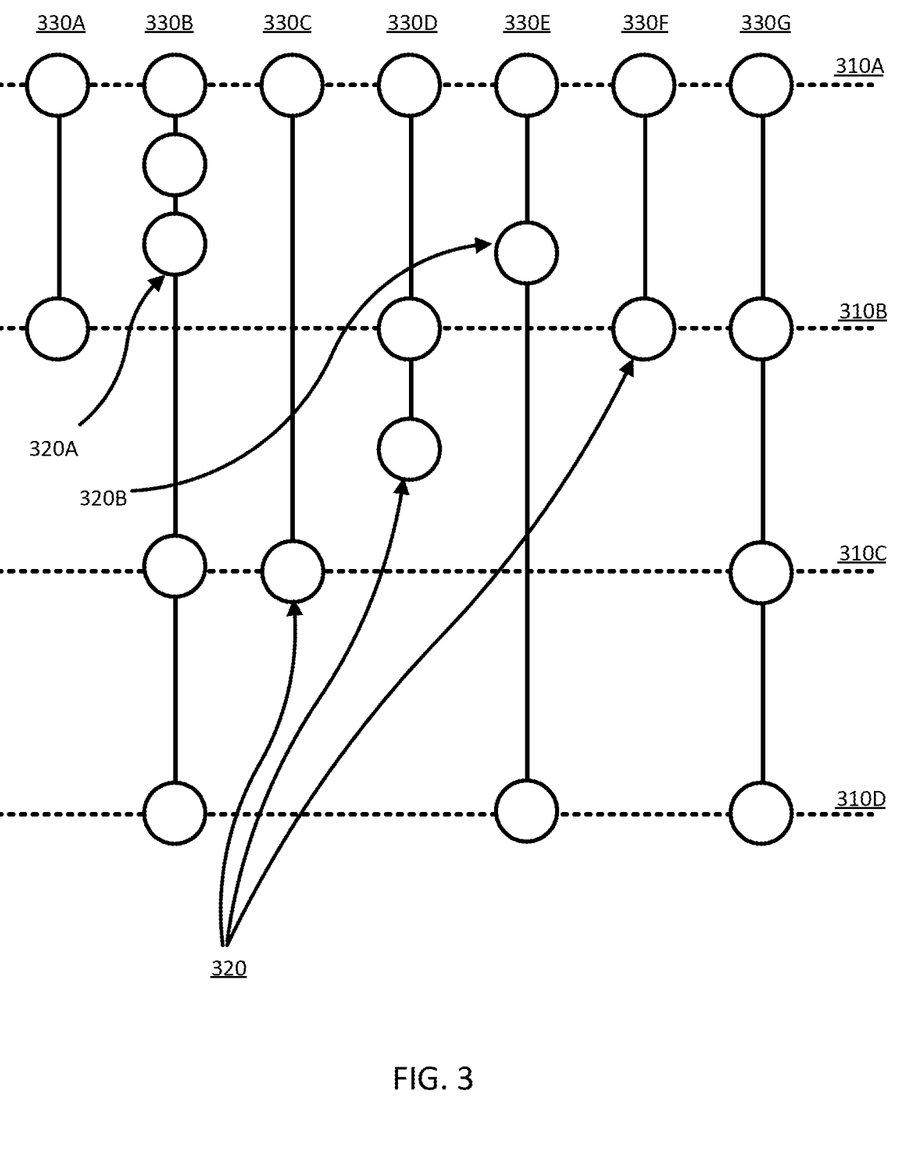
FIG. 3 is a diagram of user interaction paths in an application system including a funnel path, according to one example embodiment.

For example, FIG. 3 is an illustration of user interaction paths generated by various users in the environment 100 using the technique 200 of FIG. 2. The interactions 310 of the funnel path are represented by horizontal dashed lines. Using the given example, the first interaction 310A is sending the product information from the application system to the user, the second interaction 310B is playing an audio message sent to the user from the application system 130, the third interaction 310C is presenting a purchase page to the user via the application system 130, and the fourth interaction 310D is receiving a purchase order for the product at the application system from the user, which in this example is a positive outcome.

Returning to FIG. 2, the monitoring system 136 receives 210 interactions from users and generates user interaction paths. Each user interaction path includes the interactions between a user and the application system 130 during a monitoring session. Over time, many users are given the opportunity to buy the product at a reduced rate when interacting with the application system 130 and, generally, at least some portion of the users purchase the product. However, each user may take different actions when purchasing the product and the resulting user interaction paths can include dissimilar interactions.

For example, returning to FIG. 3, each circle represents an interaction 320 between a user and the application system 130. The interactions 320 are aggregated into user interaction paths 330 represented as a vertical column of interactions 320 connected by a solid line. The user interaction paths 330 illustrate that users complete interactions of the funnel path to varying degrees. In some instances, the user interaction paths (e.g., 330B, 330D, 330E) indicate that users took actions outside of the funnel path (indicated by interactions between dashed lines). In other instances, the user interaction paths (e.g., 330B, 330C, and 330E) illustrate that users skipped interactions included in the funnel path (indicated by user interaction paths without a circle on a dashed line). Despite not expressly following the interactions of the funnel path, some user interaction paths still purchase the product. For example, in the user interaction path of 330B, following the path from top to bottom, the user received information about the product (e.g., interaction 310A), clicked an advertisement, read a product review, viewed the purchase page (e.g., interaction 310C), and purchased the product (e.g., interaction 310D). In user interaction path 330D, again from top to bottom, the user received information about the product (e.g., interaction 310A), received an audio message about the product (e.g., 320A), and exited the application system.

The monitoring system 136 partitions 220 (FIG. 2) the user interaction paths into positive transactions and negative transactions based on outcomes. In this example, there are two possible outcomes: a positive outcome including receiving a purchase order by application system 130 for the discounted product, and a negative outcome including not receiving a purchase order for the product. Accordingly, the monitoring system 136 partitions 220 the client interaction into a group of user interaction paths that purchased the product (i.e., positive transactions) and a group of user interaction paths that did not purchase the product (i.e., negative transactions).

User interaction paths 330B, 330E, and 330G achieve the positive outcome while user interaction paths 330A, 330C, 330D, and 330F achieve the negative outcome. Accordingly, the monitoring system 136 partitions 220 the received user interaction paths of FIG. 3 into 3 positive transactions and 4 negative transactions. Notably, the example of FIG. 3 includes only 7 user interaction paths for ease of illustration, but the monitoring system 136 can analyze any number of user interaction paths.

These outcomes and the resulting partitioned 220 transactions are described as an example, however, outcomes can be more complex, require any number of interactions accomplished in any order, and reflect any potential outcome of the application system 130. For example, a positive outcome can be defined as user interaction paths that accomplish the third and fourth interaction of the funnel path while performing at least two additional interactions outside of the funnel path. In this example, only user interaction path 330B achieves that positive outcome while all others would be negative outcomes.

Monitoring system 136 analyzes 230 the positive and negative transactions to determine a correlation between interactions included in the user interaction paths and an outcome. The monitoring system 136 calculates a prevalence score for a selected interaction. In some cases, the selected interaction is an interaction from the funnel path but in other cases can be any other interaction included in a user interaction path. The prevalence score is a measure of how often the selected interaction occurs in the positive and negative transactions. As an example, using FIG. 3, the monitoring system selects the second interaction 310B of the funnel path (e.g., playing the audio message) as the selected interaction. Here, 1 out of the 3 positive transactions (e.g., user interaction path 330G) includes the selected interaction 310B and 3 of the 4 negative transactions (e.g., 330A, 330D, 330F) includes the selected interaction 310B. Accordingly, the monitoring system calculates the prevalence score of playing the audio message in the positive transactions at 33% and the prevalence score of playing the audio message in the negative transactions at 75%. In some cases, the prevalence score represents the relative difference between the prevalence score of the positive and negative transactions. In this example, the calculated prevalence scores suggest that the selected interaction 310B is correlated with negative transactions.

The monitoring system 136 calculates an efficiency score for the selected interaction. Broadly, the efficiency score is a measure of application 132 or application system 130 performance associated with the selected interaction. The monitoring system 136 can use any number or combination of metrics to calculate the efficiency score including: calculating the application performance index (i.e., apdex) for the selected interaction, a percentage of transactions that have an apdex above (or below) a threshold, response times of transactions (e.g., server calls, page loads, etc.), number of errors in transactions (e.g., load fails, incomplete loads, etc.), or histogramic analysis of the apdex for various interactions or user interaction paths.

In some configurations, the efficiency score can additionally represent a measure of the cost of an interaction or user interaction path. Improving the efficiency score may minimize the cost of those interactions. For example, an interaction including playing audio may require the application system 130 to pay an audio royalty to an owner of the audio when the interaction is executed. In this case, if playing the audio is negatively correlated to achieving an outcome, the efficiency score may be low. As such, to increase the efficiency score, the monitoring system may remove the interaction of playing the audio and reduce the royalty costs. Other example cost metrics that can be linked to an efficiency score can be server costs, bandwidth costs, discounts to trigger interactions, etc.

For example, referring to FIG. 3, the average loading time for the selected interaction 310B (e.g., the audio message) across all of the user interaction paths 330 is 1 minute via the efficiency score calculation. In ideal configurations, the average loading time for the selected interaction 310B across all user interaction paths 330 is 3 seconds (e.g., as defined in the calculation of the efficiency score). As such, the monitoring system 136 calculates a low efficiency score for the selected interaction 310B for the selected interaction across all user interaction paths. In some configurations, the monitoring system 136 can independently calculate an efficiency score for the selected interaction 310B for each of the positive and negative transactions. For example, loading the audio messages in the negative transactions (e.g., user interaction paths 330A, 330D, and 330F) averages 2 minutes and the efficiency score for the selected interaction 310B is low. Conversely, loading the audio messages in the positive transactions averages 5 seconds and the efficiency score for the selected interaction 310B is high. In some cases, the efficiency score can also represent a relative difference between the efficiency scores of the positive and negative transactions (e.g., response time differences between transactions, error count differences between transactions, histogram shifts, etc.) In this example, the efficiency scores suggest that there is a correlation between long loading times of the audio message in selected interaction 310B and the negative transactions.

The monitoring system 136 calculates 240 a success factor for the selected interaction 310B based on the prevalence score and the efficiency score. The success factor is a measure of the correlation between the prevalence of a selected interaction and the selected interactions performance leading to an outcome. For example, the monitoring system 136 assigns a scalar weight to the prevalence score for loading the audio message (e.g., the selected interaction 310B) in negative transactions. Similarly, the monitoring system assigns a scalar weight to the efficiency score for loading the audio message in negative transactions. The monitoring system calculates a success factor for the selected interaction 310B using the weighted efficiency score and weighted prevalence score using a weighting function. In one example, the success factor can be calculated using $$F_s = (P * W_P) \cdot (E * W_E) \qquad (1)$$

where $F_s$ is the success factor calculated from the prevalence score P, prevalence weighting factor $W_P$, efficiency score E, and efficiency weighting factor $W_E$. Here, the weighting factors are empirically determined for various applications 132 and desired outcomes by administrators and stored by the monitoring system 136.

In this example, the weighing function results in a calculated success factor for the selected interaction 310B indicating that long loading times for the audio message are strongly correlated to users not purchasing the product. In various embodiments, the monitoring system 136 calculates a success factor for any number of interactions included in the user interaction paths or calculates the success factors based on information included in the correlation policy.

The monitoring system 136 modifies 250 the application system 130 such that the success factor of the selected interaction is likely to increase. In this example, increasing the success factor for the selected interaction 310B increases the number of people that purchase the product (i.e., the desired outcome) using the application system 130. Accordingly, the monitoring system 136 can increase system resources of the application 132 responsible for loading the audio message such that the efficiency score for the interaction and, subsequently, success factor increases. Further, the monitoring system 136 can remove the selected interaction 310B from the funnel path to change the prevalence score and, subsequently, increase the success factor. In practice, the monitoring system 136 continuously modifies the application system 130 in any way that optimizes the number of positive transactions by increasing the success factor for the selected interaction.

In some instances, the monitoring system 136 may detect interactions not included in a system interaction path, but which are still correlated to various outcomes. In these cases, the monitoring system 136 can modify the application system 130 based on the detected correlations to achieve an outcome. As an example, in FIG. 3, the interaction 320A (e.g., viewing a product review) is not a part of the funnel path but has a high prevalence score for positive transactions leading to a high success factor. That is, every user interaction path that includes the interaction 320A is a positive transaction (e.g., 330B and 330E). Here, the monitoring system 136 may modify 250 the application system 130 to include the interaction 320A in the funnel path in order to increase the likelihood of positive transactions. That is, ensuring each user sees a product review in a system interaction path once the product goes on sale.

In another example, the technique of FIG. 2 can be applied to a retention path. In this case, the monitoring system 136 monitors all subsequent interactions between the application system 130 and a user after a specific time or interaction (e.g., the user purchasing a product on the application system). Here, for example, the monitoring system 136 defines a positive transaction as a user who interacts with the application system 130 at least one time per week after the initial purchase of the product and a negative transaction as a user who does not interact with the application system 130 at least one time per week after the initial purchase of the product.

Figure 4:
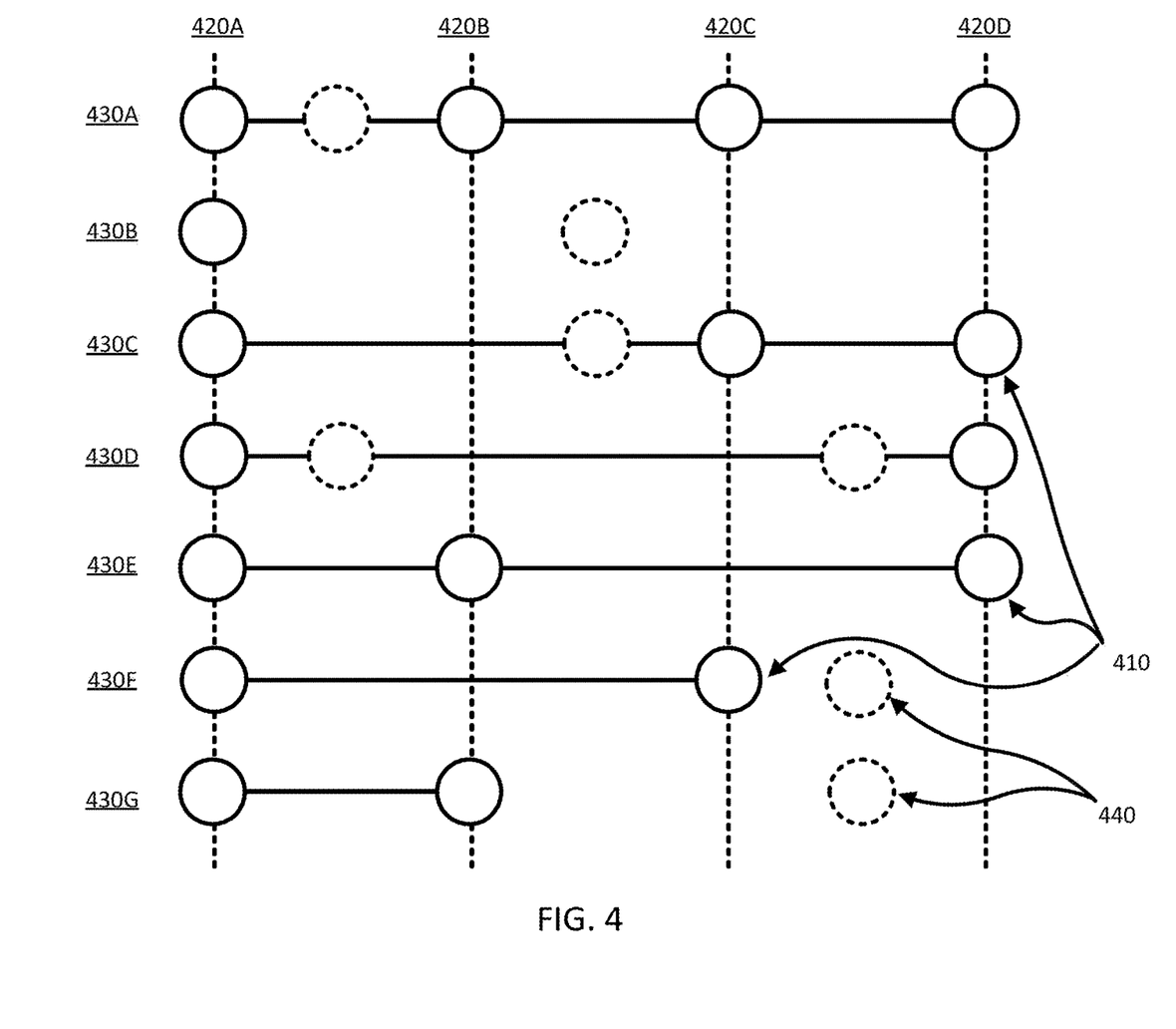
FIG. 4 is a diagram of user interaction paths in an application system including a retention path, according to one example embodiment.

FIG. 4 illustrates user interaction paths of users in the environment 100 with a retention path. In this example, the solid circles 410 indicate that a user interacts with the application system 130, for example, at least one time in a given calendar week. In alternate configurations, the retention path can also include interacting with application system 130 after a given period of inactivity, not repeating specific interactions, or any other time based interaction path.

In the example of FIG. 4, the vertical dashed lines 420 represent a single week of interactions (e.g., a first week 420A, a second week 420B, a third week 420C, and a fourth week 420D). Thus, a user interaction path 430 is a horizontal row of solid circles connected by a solid line. Given the retention path, a positive transaction is a horizontal row of circles on every dashed line (e.g., 430A) and a negative transaction is a horizontal row without solid circles on every dashed line (e.g. 430B-430G).

In the example of FIG. 4, the monitoring system 136 still receives 210, partitions 220, and analyzes 230 user interaction paths 430 and subsequently calculates 240 a success factor for a selected interaction in the user interaction paths 430. Based on the success factor, the monitoring system 136 modifies 250 the application system 130 to increase the likelihood of positive transactions. Modifying 250 the application system 130 can be similar to the modifications previously described (e.g., modifying the application system, modifying a system interaction path, allocating more hardware resources, etc.). Additionally, here, the monitoring system 136 may be configured to modify the application system 130 to create, modify, or remove interactions that encourage the use of the application system 130 (i.e., encouragement interactions 440) such that the number of positive transactions increases. Encouragement interactions 440 are represented by the dashed circles between the vertical dashed lines. Encouragement interactions 440 are any interaction generated by the application system to encourage a user to interact with the application system. Encouragement interactions 440 can include, for example, initiating a discounted rate for a product or related product, push notifications to the client device 110 of the user, email or text notifications to the user, or any other interaction that can encourage continued use of the application system 130.

In various embodiments, the monitoring system 136 is configured to create a visual representation of the calculated 240 success factors for interactions correlated to various outcomes. The visual representations allow a user of the monitoring system 136 to easily interpret and discover correlations between interactions and outcomes.

Figure 5:
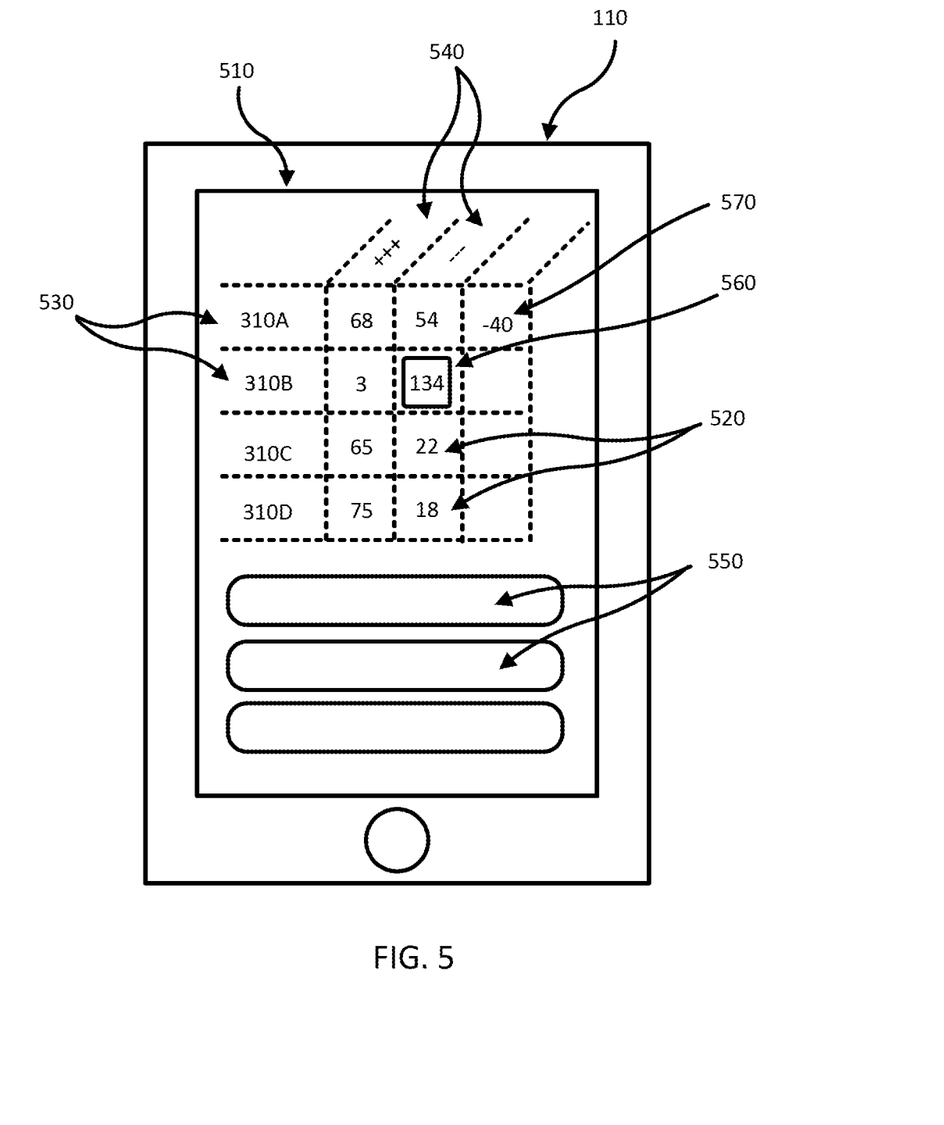
FIG. 5 is an illustration of a client device displaying a visualization of success factors indicating a correlation between interactions and outcomes, according to one example embodiment.

FIG. 5 is an example of a visualization 510 of the success factors for the selected interactions of user interaction paths displayed on a client device 110. In this example, the visualization 510 is a matrix of success factors 520 with each row 530 representing a selected interaction and each column 540 representing an outcome. For example, referring to FIG. 3, the rows of the matrix represent the interactions of the funnel path (e.g., sending information to a user 310A, playing an audio message 310B, presenting a purchasing page 310C, and receiving a purchase order 310D). The first column represents the positive outcome (e.g., completing a sale of the product) and the second column represents the negative outcome (e.g., not completing the sale of the product). Finally, the matrix elements display the calculated success factor for the corresponding interactions and outcomes.

The visualization 510 does not have to be a representative matrix but can be any other visualization capable of conveying success factors or correlation analysis (e.g., a histogram, a pie chart, a graph, etc.). Further, the visualization 510 can be modified to include any number of selected interactions and any number or type of outcomes and their calculated success factors. Generally, the modifications can be implemented using buttons 550 on the display. In some cases, the visualization 510 can include visual indicators 560 for success factors associated with strong or weak correlations to an outcome (e.g., color coding, highlighting, enlarging, etc.). In other cases, the visualization 510 can be modified to rank the success factors in regards to how well they correlate to a specific outcome. Further still, the visualization 510 can include visual indicators 570 for any aspect of the analysis 230 including the prevalence scores, efficiency scores, filters, etc.

Figure 6:
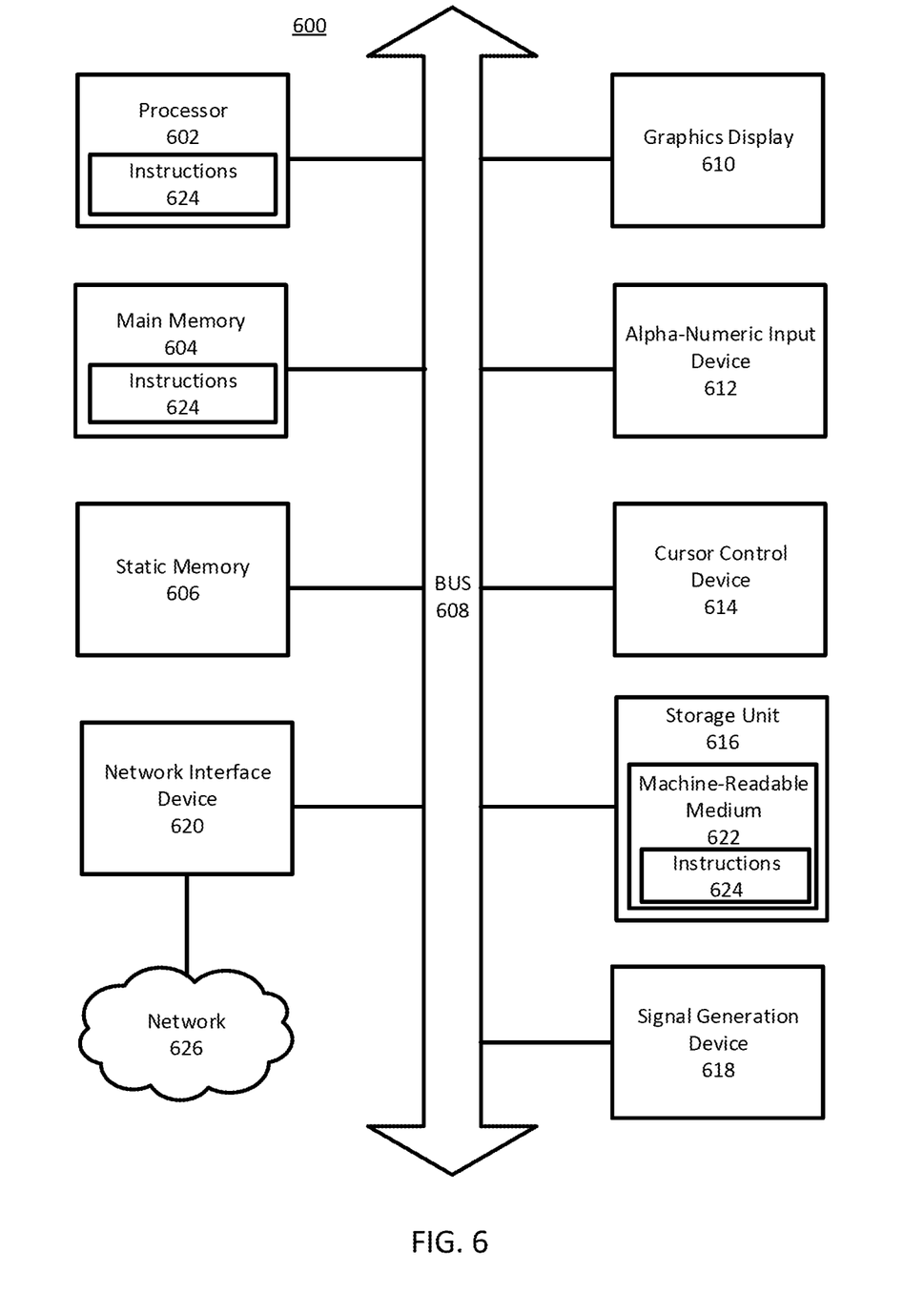
FIG. 6 is a block diagram illustrating components of a machine for reading and executing instructions from a machine-readable medium, according to one example embodiment.

FIG. 6 is a block diagram illustrating components of an example machine for reading and executing instructions from a machine-readable medium. Specifically, FIG. 6 shows a diagrammatic representation of an application system 130 and/or client device 110 in the example form of a computer system 600. The computer system 600 can be used to execute instructions 624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604, and the storage unit 616 communicate via a bus 608.

In addition, the computer system 6 can include a static memory 606, a graphics display 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. For example, the instructions 624 may include the functionalities of modules of the application system 130 described in FIG. 1. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

[C: Concluding Boilerplate.] Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes, and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

In alternate embodiments, aspects of the invention are implemented in computer hardware, firmware, software, and/or combinations thereof. Apparatus of the invention can be implemented in a computer program product tangibly embodied in a machine-readable storage device for execution by a programmable processor, and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A method for optimizing the number of users achieving an outcome of an application system comprising:
receiving a set of user interaction paths, wherein:
each user interaction path includes a set of executed interactions, and
each set of executed interactions includes a subset of a plurality of potential interactions between a user of a client device and the application system;
partitioning the set of user interaction paths into a first group of user interaction paths and a second group of user interaction paths, wherein:
the first group includes user interaction paths of the set that achieve the outcome of the application system, and
the second group includes the remaining user interaction paths of the set that do not achieve the outcome of the application system;
for each executed interaction of the user interaction paths:
analyzing the executed interaction to determine an efficiency score and a prevalence score of the executed interaction for the first group and the second group, the efficiency score representing a performance metric of the executed interaction in the application system, and the prevalence score representing the prevalence of the executed interaction in the user interaction paths;
calculating a success factor for the executed interaction based on the prevalence score and the efficiency score, the success factor describing an effect of the executed interaction on achieving the outcome of the application system; and
modifying the application system based on the calculated success factors to increase a likelihood that users of the client device achieve the outcome of the application system.

2. The method of claim 1, further comprising:
receiving a correlation request including a correlation policy from the client device;
analyzing each executed interaction of the received user interaction paths based on the correlation policy; and
sending a result of the correlation request including the calculated success factor to the client device.

3. The method of claim 1, further comprising:
generating a visual representation of the calculated success factors for the executed interactions.

4. The method of claim 1, further comprising:
generating a set of interactions for the user of the client device after a specific executed interaction is received.

5. The method of claim 1 wherein analyzing the executed interactions is based on a system interaction path, the system interaction path a set of interactions generated for the user of the client device to facilitate achieving the outcome.

6. The method of claim 1 wherein calculating the success factor further comprises:
assigning a first weight to the prevalence score and a second weight to the efficiency score; and
calculating the success factor using a weighting function, the weighted prevalence score, and the weighted efficiency score.

7. The method of claim 1 further comprising:
filtering at least one user interaction path from the set of user interaction paths based on a correlation policy.

8. The method of claim 1 wherein modifying the application system further comprises:
assigning additional hardware resources to executed interactions based on the success factor for the executed interaction.

9. The method of claim 1 wherein modifying the application system further comprises:
removing at least one interaction from a plurality of potential interactions based on the success factor for the executed interaction.

10. The method of claim 1 wherein modifying the application system further comprises:
generating an encouraging interaction for the user of the client device based on the success factor, the encouraging interaction configured to promote the prevalence of an executed interaction.

11. A non-transitory computer readable storage medium comprising instructions, that when executed by a processor, causing the processor to:
receive a set of user interaction paths, wherein:
each path includes a set of executed interactions, and
each set of executed interactions includes a subset of a plurality of potential interactions between a user of a client device and the application system;
partition the set of user interaction paths into a first group of user interaction paths and a second group of user interactions paths, wherein:
the first group includes user interaction paths of the set that achieve the outcome of the application system, and
the second group includes the remaining user interaction paths of the set that do not achieve the outcome of the application system;
for each executed interaction of the user interaction paths:
analyze the executed interaction to determine an efficiency score and a prevalence score of the executed interaction for the first group and the second group, the efficiency score representing a performance metric of the executed interaction in the application system, and the prevalence score representing the prevalence of the executed interaction in the user interaction paths;
calculate a success factor for the executed interaction based on the prevalence score and the efficiency score, the success factor describing an effect of the executed interaction on achieving the outcome of the application system; and
modify the application system based on the calculated success factors to increase a likelihood that users of the client device achieve the outcome of the application system.

12. The non-transitory computer readable storage medium of claim 11, wherein the instructions further cause the processor to:
receiving a correlation request including a correlation policy from the client device;
analyzing each executed interaction of the received user interaction paths based on the correlation policy; and
sending a result of the correlation request including the calculated success factor to the client device.

13. The non-transitory computer readable storage medium of claim 11, wherein the instructions further cause the processor to:
generate a visual representation of the calculated success factors for the executed interactions.

14. The non-transitory computer readable storage medium of claim 11, wherein the instructions further cause the processor to:
generate a set of interactions for the user of the client device after a specific executed interaction is received.

15. The non-transitory computer readable storage medium of claim 11, wherein analyzing the executed interactions is based on a system interaction path, the system interaction path a set of interactions generated for the user of the client device to facilitate achieving the outcome.

16. The non-transitory computer readable storage medium of claim 11 wherein calculating the success factor further causes the processor to:
assign a first weight to the prevalence score and a second weight to the efficiency score; and
calculate the success factor using a weighting function, the weighted prevalence score, and the weighted efficiency score.

17. The non-transitory computer readable storage medium of claim 11, wherein the instructions further cause the processor to:
filtering at least one user interaction path from the set of user interaction paths based on a correlation policy.

18. The non-transitory computer readable storage medium of claim 11, wherein modifying the application system further causes the processor to:
assign additional hardware resources to executed interactions based on the success factor for the executed interaction.

19. The non-transitory computer readable storage medium of claim 11, wherein modifying the application system further causes the processor to:
remove at least one interaction from a plurality of potential interactions based on the success factor for the executed interaction.

20. The non-transitory computer readable storage medium of claim 11, wherein modifying the application system further causes the processor to:
generate an encouraging interaction for the user of the client device based on the success factor, the encouraging interaction configured to promote the prevalence score of an executed interaction.

21. A system comprising:
a computer processor;
a memory storing instructions that, when executed by the computer processor, cause the computer processor to:
receive a set of user interaction paths, wherein:
each user interaction path includes a set of executed interactions, and
each set of executed interactions includes a subset of a plurality of potential interactions between a user of a client device and the application system;
partition the set of user interaction paths into a first group of user interactions paths and a second group of user interaction paths, wherein:
the first group includes user interaction paths of the set that achieve the outcome of the application system, and
the second group includes the remaining user interaction paths of the set that do not achieve the outcome of the application system;
for each executed interaction of the user interaction paths:
analyze the executed interaction to determine an efficiency score and a prevalence score of the executed interaction for the first group and the second group, the efficiency score representing a performance metric of the executed interaction in the application system, and the prevalence score representing the prevalence of the executed interaction in the user interaction paths;
calculate a success factor for the executed interaction based on the prevalence score and the efficiency score, the success factor describing an effect of the executed interaction on achieving the outcome of the application system; and
modify the application system based on the calculated success factors to increase a likelihood that users of the client device achieve the outcome of the application system.

* * * * *

UNITED STATES PATENT AND TRADEMARK OFFICE
CERTIFICATE OF CORRECTION

PATENT NO. : 10,827,013 B2
APPLICATION NO. : 15/853479
DATED : November 3, 2020
INVENTOR(S) : Karon et al.

It is certified that error appears in the above-identified patent and that said Letters Patent is hereby corrected as shown below:

On the Title Page

Item (51), Column 1, under "Int. Cl.", Line 3, after "H04L" delete "29/08" and insert -- 67/025 --, therefor.

In the Claims

In Column 14, in Claim 7, Line 4, after "claim 1" insert -- , --, therefor.

In Column 14, in Claim 11, Line 34, delete "interactions" and insert -- interaction --, therefor.

In Column 16, in Claim 21, Line 16, delete "interactions" and insert -- interaction --, therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*